April 6, 1954  S. J. KRULIKOSKI, JR., ET AL  2,674,691
PULSE FORMING CIRCUIT

Filed Dec. 30, 1949   2 Sheets-Sheet 1

INVENTORS
STANLEY J. KRULIKOSKI, JR.
& DANA C. MANNING &
BY JOSEPH F. CLAYTON

Ellsworth R. Reston
ATTORNEY

April 6, 1954  S. J. KRULIKOSKI, JR., ET AL  2,674,691
PULSE FORMING CIRCUIT
Filed Dec. 30, 1949  2 Sheets-Sheet 2

*INVENTOR.*
STANLEY J. KRULIKOSKI, JR
& DANA C. MANNING &
BY  JOSEPH F. CLAYTON

Ellsworth R. Poston
ATTORNEY

Patented Apr. 6, 1954

2,674,691

UNITED STATES PATENT OFFICE 2,674,691

PULSE FORMING CIRCUIT

Stanley J. Krulikoski, Jr., Dearborn, and Dana C. Manning and Joseph F. Clayton, Detroit, Mich., assignors to Bendix Aviation Corporation, Detroit, Mich., a corporation of Delaware Application December 30, 1949, Serial No. 135,952

9 Claims. (Cl. 250—27)

This invention relates to pulse forming circuits, and more particularly to pulse forming circuits providing a maximum amount of power and stability.

In line pulse forming circuits using inductance charging from a source of alternating voltage, a power supply charges, for a predetermined period of time, a network having a capacitive reactance at the charging frequency. The network is part of a series resonant circuit so that it is charged to a relatively high voltage during the charging period, which may comprise one or more cycles. At the end of the charging period, a switch is closed to permit the network to discharge through a load, producing a pulse across the load. The charge and discharge of the network are repeated at predetermined intervals to provide pulses having a definite repetition frequency. The pulses are utilized in many types of radar systems to obtain the direction and range of a distant object.

To close the switch, previous circuits have relied on a specific phase relationship between the applied voltage and the voltage on the network. Any changes in the frequency of the applied voltage cause this phase relationship to vary. As a result, changes in the frequency of the applied voltage prevent the network from discharging at the instant that it has been charged to a maximum value.

This invention employs a fixed phase relationship between the charging current and the voltage on the network to provide a pulse whose characteristics are substantially independent of the frequency of the applied voltage.

An object of this invention is to provide a circuit for producing a pulse of maximum stability regardless of any changes in the frequency of the applied voltage.

Another object is to provide a circuit of the above character for producing a pulse of maximum amplitude even though the frequency of the applied signal may vary.

A further object is to provide a synchronizing pulse forming circuit having a fixed phase relationship between the charging current and the voltage on the network.

Still another object is to provide a circuit of the above character which will require a minimum number of parts and occupy a minimum amount of space.

A still further object of the invention is to provide a circuit of the above character which will be efficient and reliable in operation under all conditions.

Other objects and advantages of the invention will be apparent from a detailed description of the invention and from the appended drawings and claims.

Figure 1:
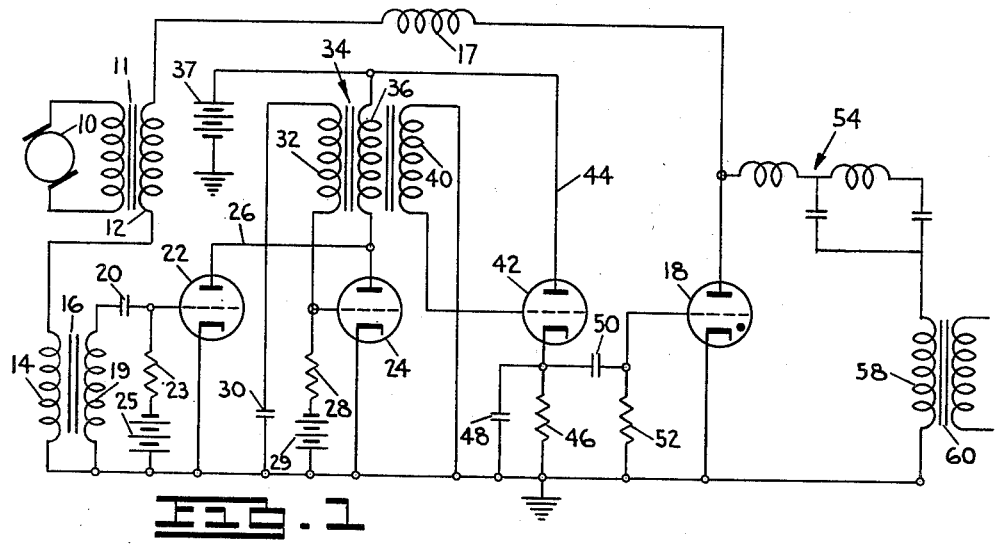
Figure 1 is a schematic diagram of a pulse forming circuit.

In the embodiment of the invention shown in Figure 1, alternating voltage is applied by a generator 10 to a transformer 11. The transformer has one side of its secondary winding 12 connected to the primary winding 14 of a differentiating transformer 16, and the other side of the secondary winding 12 is connected through a charging inductance 17 to the plate of a gas-filled tube 18, such as a hydrogen thyratron tube. The primary winding 14 and secondary winding 19 of the transformer 16 are connected together at one side and grounded. The other side of the secondary winding 19 is connected through a blocking condenser 20 to the grid of a tube 22. A grid leak resistance 23 is provided between the grid and the negative terminal of a battery 25, the positive terminal of which is grounded. The cathode of the tube 22 is also grounded.

The plates of the tube 22 and of a second tube 24 are connected by a lead 26. The grid of the tube 24 is connected through a grid leak resistance 28 to the negative terminal of a battery 29, the positive terminal of which is grounded, and the cathode of the tube 24 is also grounded. The resistance 28 and battery 29 are in parallel with a branch which has a condenser 30 in series with a secondary winding 32 of a transformer, generally indicated at 34. The primary winding 36 of the transformer 34 is connected between the plate of the tube 24 and the positive terminal of a plate supply, such as the battery 37, the negative terminal of which is grounded. A secondary winding 40 is connected between the grid of a tube 42 and ground.

Plate voltage for the tube 42 is supplied through a lead 44 from the battery 37. The cathode of the tube is connected to ground through a resistance 46 and a by-pass condenser 48 in parallel with the resistance. The cathode is also connected through a blocking condenser 50 to the grid of the hydrogen thyratron tube 18. A resistance 52 is provided between the grid of the tube 18 and ground, and the cathode is grounded. In addition to being connected through the inductance 17 to the secondary winding 12 of the transformer 10, the plate of tube 18 is connected in series with a pulse forming network, generally indicated at 54, having a plurality of sections of inductances and capacitances, with the capacitance of each section having a value of C. With $n$ sections, the network has a capacitive reactance of approximately $$\frac{-j}{w_a n C}$$

at the frequency of the applied voltage where $w_a$ is the angular frequency of the applied voltage. The network 54 is connected to the primary winding 58 of a pulse transformer 60 and the other end of the primary winding is grounded.

The inductance of the differentiating transformer 16 is low for large currents. As is well known, the voltage induced in a transformer as current flows through it is proportional to $L di/dt$, where L is the inductance and $di/dt$ is the rate of change of current. When a current having a waveform resembling a sine wave flows through the transformer 16, both L and $di/dt$ have high values as the current passes through zero and low values as the current approaches a positive or negative peak. As a result, the voltage induced in the transformer has a positive pip when the current is passing through zero in a positive direction and a negative pip when the current is passing through zero in a negative direction.

The positive voltage pip produced by the transformer 16 is applied to the grid of the tube 22, causing the current through the tube to increase and the plate voltage to drop. Since the plates of the tubes 22 and 24 are connected together, the drop in plate voltage on the tube 22 produces a corresponding drop in the plate voltage on the tube 24 and therefore an increase in voltage across the winding 36. This causes a voltage pulse to be induced in the winding 32 and this pulse is applied to the grid of the tube 24, causing the current through the tube to increase and the plate voltage to drop even further. As a result, the voltage pulse across the winding 36 is amplified by the regenerative action of the tube 24 and the transformer 34.

The voltage pulse in the winding 36 is induced in the winding 40 and introduced to the grid of the tube 42. This causes the current through the tube to increase and produces a trigger pulse across the resistance 46. This pulse is applied to the grid of the hydrogen thyratron tube 18. The tube 18 is normally cut off but the trigger pulse from the resistance 46 causes the tube to break down and conduct.

The current flowing through the differentiating transformer 16 also flows through a circuit which includes the secondary winding 12 of the transformer 11, the inductance 17, the network 54 and primary winding 58 of the transformer 60. This circuit is series resonant, thereby causing a large amount of energy to be stored in the network 54 during each cycle of applied voltage. Since the network is capacitive at the frequency of the applied voltage, the current which flows through the resonant circuit to charge the network 54 leads the voltage on the network by 90°. As previously stated, the hydrogen thyratron tube 18 is triggered and conducts when the current through the transformer 16 is zero. Because of the 90° phase difference, the network 54 is charged to a maximum voltage at this instant. When the tube 18 conducts, the network discharges through a circuit which includes the network, the tube 18 and the primary winding 58 of the pulse transformer 60. The discharge of the network produces a pulse of short duration and of an amplitude determined by the energy stored in the network.

As discussed above, both the formation of the voltage pip in the differentiating transformer 16 and the maximum charging of the network 54 occur when the current in the charging circuit is zero. Therefore, the network 54 will discharge at a voltage maximum whether or not there is any variation in the frequency of the signal applied to the transformer 11.

Figure 2:
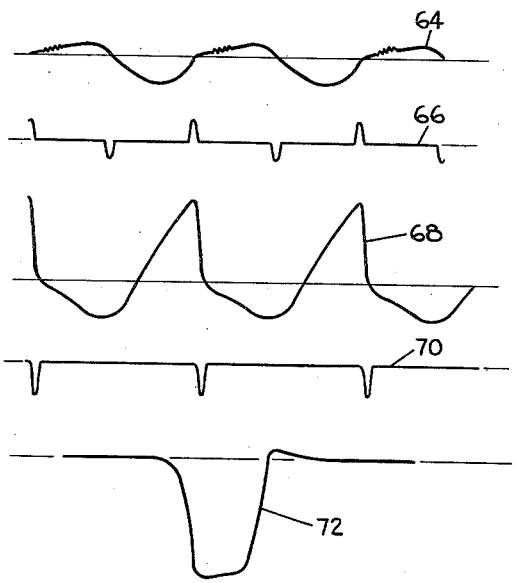
Figure 2 illustrates waveforms of the voltage and current at various points in the pulse forming circuit shown in Figure 1.

These relationships are illustrated by the curves shown in Figure 2. Curve 64 shows the charging current through the transformer 16 and the network 54. The voltage pips produced by the transformer 16 are shown in curve 66, and the voltage on the network 54 is shown in curve 68. As may be seen, the positive pips shown in curve 66 coincide in phase with the maximum voltages on the network. Curve 70 shows the shape and phase of the pulses produced across the pulse transformer 60 by the discharge of the network 54. In curve 72, one of the pulses is enlarged to illustrate its shape more clearly.

Figure 3:
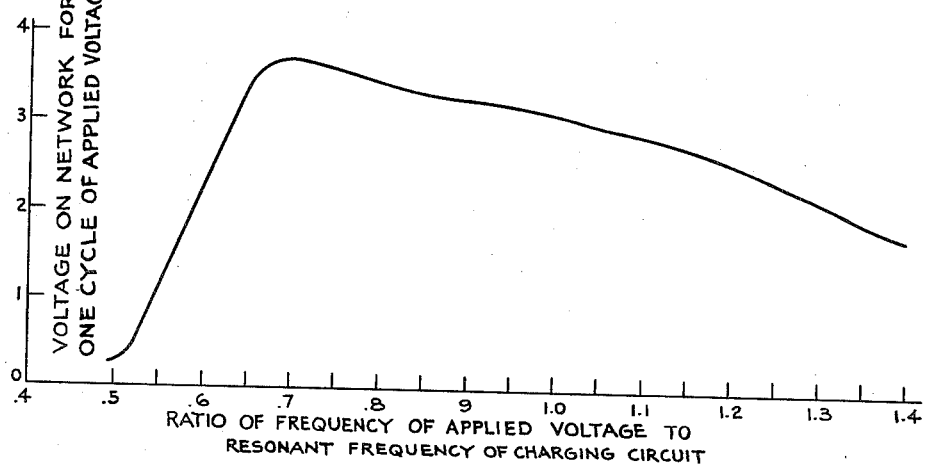
Figure 3 is a graph showing the maximum voltage to which the condenser is charged when the frequency of the applied voltage varies with respect to the resonant frequency of the charging circuit.

Figure 3 is a graph which shows the maximum voltage to which the network 54 is charged when the ratio between the frequency of the applied signal and the resonant frequency of the tuning circuit varies. As may be seen, the optimum voltage which can be obtained on the network occurs when the applied frequency is approximately 70% of the frequency to which the charging circuit is tuned. If the applied frequency is taken at approximately 80% of the tuned frequency of the charging circuit, a negative drift in the frequency of the applied signal will cause the maximum voltage on the network to increase slightly and a positive drift will cause the maximum network voltage to decrease slightly. However, the maximum network voltage will be substantially constant for the frequency range of the applied signal which will normally be encountered. This causes the amplitude of the pulses formed across winding 58 to be substantially constant under normal operating conditions.

Figure 4:
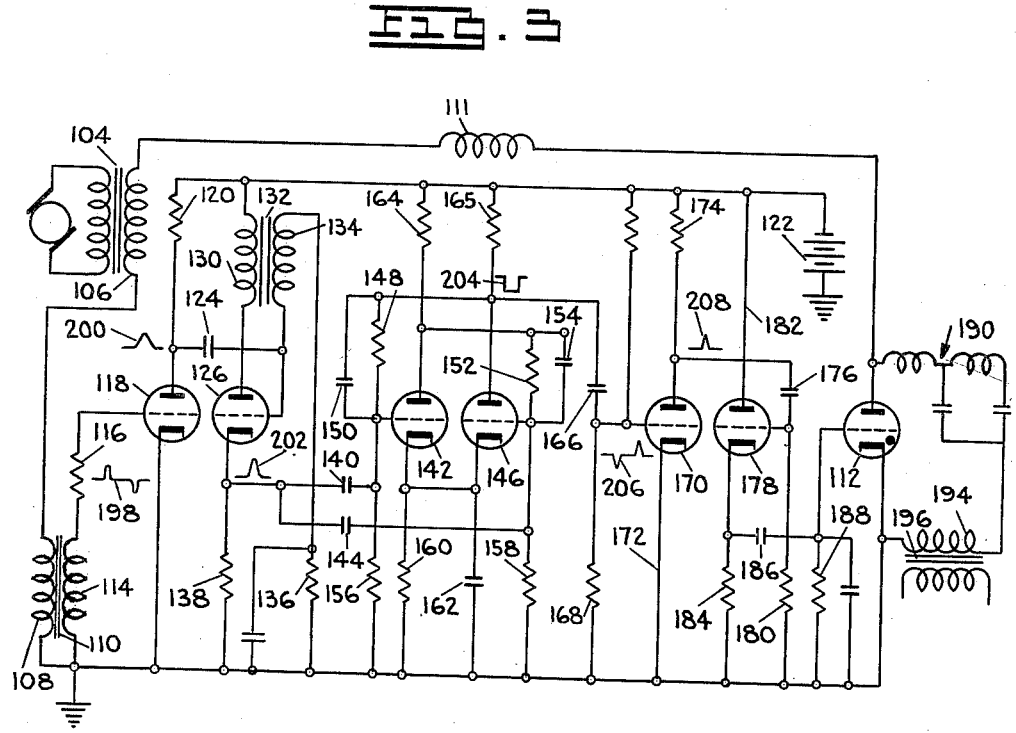
Figure 4 is a schematic diagram of a circuit illustrating another embodiment of the invention.

In Figure 4, a circuit is shown for producing pulses during alternate cycles of applied voltage. In this circuit, the secondary winding 106 of a transformer 104 is connected between the primary winding 108 of a differentiating transformer 110 and a charging inductance 111, which is connected to the plate of a hydrogen thyratron tube 112. The winding 108 is also connected to one side of the secondary winding 114, which is grounded. The other side of the secondary winding is connected through a resistance 116 to the grid of a tube 118.

The cathode of the tube 118 is grounded and a positive voltage is applied to the plate through a resistance 120, the voltage being supplied from a suitable source, such as a battery 122. The plate is also connected through a capacitance 124 to the grid of a second tube 126.

The primary winding 130 of a transformer 132 is connected between the plate of the tube 126 and the positive terminal of the battery 122. The secondary winding 134 is connected between the grid of the tube and a grounded resistance 136. A resistance 138 extends from the cathode to ground.

The cathode of the tube 126 is connected through a coupling capacitance 140 to the grid of a tube 142 and through a coupling capacitance 144 to the grid of a tube 146. A resistance 148 and capacitance 150 are provided in parallel between the grid of the tube 142 and the plate of the tube 146. Likewise, a resistance 152 and a capacitance 154 are provided in parallel between the grid of the tube 146 and the plate of the tube 142. The grids of the tubes 142 and 146 are grounded through resistances 156 and 158, respectively, and the cathodes are joined together and grounded through a resistance 160 and a capacitance 162 in parallel. Voltage is applied to the plates of the tubes through resistances 164 and 165, respectively. A differentiating circuit comprising a capacitance 166 and a resistance 168 in series is connected between the plate of the tube 146 and ground.

Voltage from the plate of the tube 146 is applied through the condenser 166 to the grid of a tube 170. The cathode of the tube is grounded by a lead 172, and voltage from the battery 122 is applied to the plate through a resistance 174. The plate is also connected through a coupling capacitance 176 to the grid of a tube 178, the grid being grounded through a resistance 180.

The tube 178 has its plate connected to the battery 122 and its cathode connected through a resistance 184 to ground. The voltage on the cathode of the tube 178 is applied through a coupling capacitance 186 to the grid of the hydrogen thyratron tube 112, the grid being grounded through a resistance 188. The plate of the tube is connected in series with a network, generally indicated at 190, and with the primary winding 194 of a pulse transformer 196, one side of the primary winding being grounded. The network 190 is similar to the network 54 shown in Figure 1.

In the pulse forming circuit shown in Figure 4, the negative pip produced by the differentiating transformer 110 during each cycle of alternating voltage is introduced to the grid of the tube 118, which is normally conducting. The appearance of the voltage pips formed by the differentiating transformer is illustrated by the waveform 198. The negative pip cuts the tube off and causes a positive signal having the appearance of the waveform 200 to appear at the plate. This positive signal is introduced to a blocking oscillator which includes the tube 126 and transformer 132. The blocking oscillator sharpens and amplifies the positive signal in a manner similar to that discussed in Figure 1 and produces a signal having a shape illustrated by waveform 202.

The signal illustrated by the waveform 202 is taken off the cathode of the tube 126 and introduced to the grids of the tubes 142 and 146, which form a flip-flop multivibrator. One positive signal from the cathode of the tube 126 causes the tube 146 to conduct; the second positive signal causes the tube 146 to be cut off and the tube 142 to conduct; and the third positive signal causes the tube 142 to be cut off and the tube 146 to conduct, etc. Thus, the tube 146 conducts for alternate signals from the tube 126 and in effect constitutes a frequency divider. The pulses produced at the plate of tube 146 have a substantially rectangular shape, as illustrated by the waveform 204.

The rectangular pulses produced on the plate of the tube 146 are differentiated by the capacitance 166 and resistance 168 to produce a negative signal at the leading edge of the pulse and a positive signal at the trailing edge. These signals have a shape indicated by the waveform 206. The negative signal is utilized at the grid of the tube 170 to cut off the tube and produce a positive triggering signal at the plate of the tube with a shape illustrated by the waveform 208. This positive triggering signal is passed through a cathode follower circuit which includes the triode 178 and is taken off the cathode of the tube 178 and introduced to the grid of the hydrogen thyratron tube 112. The tube 112 then conducts and provides a discharge path for the network 190, as previously disclosed in connection with the circuit shown in Figure 1. A resultant pulse is produced in the transformer 196 which may be used to modulate the signals from a transmitter (not shown).

As may be seen, pulse forming circuits have been disclosed for producing pulses of maximum stability and amplitude regardless of the frequency of the applied voltage. The circuits do not require any adjustment with changes in the frequency of the applied signal. They may be adapted to produce a pulse for each cycle of applied voltage, for alternate cycles, or for any other number of cycles.

Although this invention has been disclosed and illustrated with reference to particular applications, it must be appreciated that the principles involved are susceptible of numerous other applications which will be apparent to persons skilled in the art. The invention is therefore to be limited only as indicated by the scope of the appended claims.

What is claimed is:

1. A pulse forming circuit, including, a source of alternating voltage, means, including a differentiating reactance and a network, connected in series with the voltage source to form a resonant charging circuit, the differentiating reactance being adapted to produce a voltage pip at substantially zero current through it, means associated with the differentiating reactance for converting the voltage pips into triggering signals, and a normally open switch connected to the network and the triggering means to provide a discharge path for the network upon the formation of each triggering signal.

2. A pulse forming circuit, including, a source of alternating voltage, a load, a network having a capacitive reactance at the frequency of the alternating voltage, a differentiating transformer having primary and secondary windings, the primary winding being connected in series with the voltage source, the network and the load to provide voltage pips at substantially zero current therethrough, a gas-filled tube having a cathode, grid and plate, the tube being connected across the network and load, and means connected between the secondary winding of the differentiating transformer and the tube grid to produce conduction of the tube upon the formation of the voltage pips, the tube providing a discharge path for the network during conduction.

3. A pulse forming circuit, including, a source of alternating voltage, a network having a capacitive reactance at the frequency of the alternating voltage, a load, an inductance connected in series with the voltage source, the network and the load to provide a voltage pip at substantially zero current therethrough, a normally non-conductive gas-filled tube connected across the network and load, and means associated with the inductance and the gas-filled tube for converting the voltage pips into triggering signals to provide conduction through the tube for the resultant discharge of the network.

4. A pulse forming circuit, including, a source of alternating voltage, a network having a capacitive reactance connected to the voltage source, a differentiating transformer connected in series with the network and the voltage source to produce a voltage pip for substantially maximum voltages on the network, and a normally open switch connected to the network and adapted to be closed upon the formation of voltage pips to provide a discharge path for the network.

5. A pulse forming circuit, including, a source of alternating voltage, a network, a load, magnetically operative means forming a series circuit with the voltage source, the network and the load to provide a voltage pip at substantially zero current therethrough, a normally open switch connected across the network and load, and means connected between the magnetic means and the switch for converting the voltage pips into triggering signals to provide conduction through the tube for the resultant discharge of the network.

6. A pulse forming circuit, including, a source of alternating voltage, a network adapted to be charged by the voltage source, a differentiating reactance adapted to produce a triggering pulse for substantially zero currents through it, a load, means, including the voltage source, the network, the differentiating reactance and the load, connected in series to form a resonant charging circuit for charging the network to a maximum value when the current through it is substantially zero, and a normally open switch controlled by triggering pulses from the reactance and connected to the network and the load to provide a path for the discharge of the network through the load upon the formation of the triggering pulses.

7. A pulse forming circuit, including, a source of alternating voltage, a network adapted to be charged by the voltage source, magnetically operative means adapted to produce a triggering pulse upon the flow of substantially zero current through it, a load, means, including the voltage source, the network, the load and the magnetically operative means, connected in series to form a circuit resonant at substantially the frequency of the alternating voltage, and a normally open switch connected to the network and the load and operative upon a triggering pulse from the magnetically operative means to provide a discharge path for the network through the load.

8. A pulse forming circuit, including, a source of alternating voltage, a network adapted to be charged by the voltage source, an inductance adapted to produce a triggering pulse for substantially zero currents through it, a load, means, including the voltage source, the network, the inductance and the load, connected in series to form a circuit resonant at substantially the frequency of the alternating voltage, and a gas-filled tube having a cathode, a grid and a plate, the grid of the tube being connected to the inductance to receive the triggering pulses and the cathode and plate of the tube being connected between the network and the load to provide a path for discharging the network through the load upon the introduction of the triggering pulses to the grid.

9. A pulse forming circuit, including, a source of alternating voltage, a network adapted to be charged by the voltage source, a differentiating reactance adapted to produce a triggering pulse for substantially zero currents through it, a load, means, including the voltage source, the network, the differentiating reactance and the load, connected in series to form a circuit resonant at substantially the frequency of the alternating voltage, and a normally cut-off gas-filled tube having a cathode, a grid and a plate, the grid of the tube being connected to the differentiating reactance and being biased to produce a conduction of the tube upon the introduction of the triggering pulses, and the plate and cathode of the tube being connected to the network and the load to provide a path for discharging the network through the load upon the conduction of the tube.

References Cited in the file of this patent

UNITED STATES PATENTS

| Number | Name | Date |
|---|---|---|
| 2,405,069 | Tonks | July 30, 1946 |
| 2,409,897 | Rado | Oct. 22, 1946 |
| 2,429,471 | Lord | Oct. 21, 1947 |
| 2,444,782 | Lord | July 6, 1948 |
| 2,577,512 | Cooper et al | Dec. 4, 1951 |